US011218929B2

(12) United States Patent
Wu et al.

(10) Patent No.: US 11,218,929 B2
(45) Date of Patent: Jan. 4, 2022

(54) INFORMATION TRANSMISSION METHOD AND APPARATUS AND COMMUNICATION SYSTEM (71) Applicant: FUJITSU LIMITED, Kawasaki (JP)

(72) Inventors: Lianhai Wu, Beijing (CN); Hua Zhou, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 5 days.

(21) Appl. No.: 16/253,064

(22) Filed: Jan. 21, 2019

(65) Prior Publication Data
US 2019/0159084 A1 May 23, 2019

Related U.S. Application Data (63) Continuation of application No. PCT/CN2016/094630, filed on Aug. 11, 2016.

(51) Int. Cl.
H04W 36/00 (2009.01)
H04W 4/40 (2018.01)
(Continued)

(52) U.S. Cl.
CPC .............. *H04W 36/03* (2018.08); *H04W 4/40* (2018.02); *H04W 40/00* (2013.01);
(Continued)

(58) Field of Classification Search
CPC ... H04W 36/03; H04W 36/305; H04W 40/00; H04W 40/248; H04W 40/28; H04W 40/49; H04W 72/042
See application file for complete search history.

(56) References Cited

U.S. PATENT DOCUMENTS 8,514,825 B1 * 8/2013 Addepalli ............... H04L 45/12
370/338
9,066,324 B2 * 6/2015 Kwon .................... H04W 76/14
(Continued)

FOREIGN PATENT DOCUMENTS

CN 104540159 A 4/2015
WO 2015/043471 A1 4/2015

OTHER PUBLICATIONS

Ericsson, "V2X Path Selection", Agenda Item: 8.2.2, 3GPP TSG-RAN WG2 Meeting #94, R2-164113, Nanjing, P.R. China, May 23-27, 2016.
(Continued)

Primary Examiner — Jenee Holland
(74) Attorney, Agent, or Firm — Myers Wolin, LLC (57) ABSTRACT This disclosure provides an information transmission method and apparatus and communication system. The method includes: receiving, by a user equipment, indication information transmitted by a base station indicating that the user equipment is capable of using the sidelink in a case where the air-interface link is incapable of normally transmitting data; and using the sidelink by the user equipment to perform data transmission with another user equipment in the case where the air-interface link is incapable of normally transmitting data. Hence, even if in a case where an air-interface link is unable to transmit data normally, data information may be transmitted successfully in other links.

8 Claims, 7 Drawing Sheets (51) Int. Cl.
*H04W 40/00* (2009.01)
*H04W 40/24* (2009.01)
*H04W 40/28* (2009.01)
*H04W 72/04* (2009.01)
*H04W 36/30* (2009.01)
*H04W 4/44* (2018.01)
*H04W 4/46* (2018.01)

(52) U.S. Cl.
CPC ......... *H04W 40/248* (2013.01); *H04W 40/28* (2013.01); *H04W 72/042* (2013.01); *H04W 36/305* (2018.08)

(56) References Cited

U.S. PATENT DOCUMENTS

| | | | | |
|---|---|---|---|---|
| 9,204,257 | B1* | 12/2015 | Mendelson | G06Q 30/0261 |
| 9,768,933 | B2* | 9/2017 | Hwang | H04L 5/0055 |
| 2007/0129076 | A1* | 6/2007 | Cho | H04W 88/02 455/436 |
| 2010/0261469 | A1* | 10/2010 | Ribeiro | H04W 99/00 455/423 |
| 2011/0228666 | A1* | 9/2011 | Barbieri | H04W 76/14 370/216 |
| 2012/0163252 | A1* | 6/2012 | Ahn | H04W 52/48 370/280 |
| 2012/0243431 | A1* | 9/2012 | Chen | H04W 52/383 370/252 |
| 2013/0078945 | A1* | 3/2013 | Lavi | H04W 84/22 455/410 |
| 2013/0083779 | A1* | 4/2013 | Ahn | H04W 72/04 370/336 |
| 2013/0178213 | A1* | 7/2013 | Li | H04W 36/0085 455/436 |
| 2014/0071950 | A1* | 3/2014 | Jang | H04W 36/0072 370/331 |
| 2014/0078952 | A1* | 3/2014 | Bontu | H04W 76/14 370/312 |
| 2014/0105178 | A1* | 4/2014 | Jang | H04W 76/23 370/331 |
| 2014/0155114 | A1* | 6/2014 | Wu | H04W 36/03 455/509 |
| 2014/0204847 | A1* | 7/2014 | Belleschi | H04W 76/14 370/329 |
| 2014/0226629 | A1* | 8/2014 | Kim | H04W 24/02 370/331 |
| 2014/0235248 | A1* | 8/2014 | Chai | H04W 76/14 455/436 |
| 2014/0294118 | A1* | 10/2014 | Baik | H04L 1/0009 375/296 |
| 2014/0314039 | A1* | 10/2014 | Jang | H04W 76/14 370/329 |
| 2014/0348081 | A1* | 11/2014 | Liao | H04L 67/16 370/329 |
| 2015/0156807 | A1* | 6/2015 | Guo | H04W 76/14 370/329 |
| 2015/0195827 | A1* | 7/2015 | Feng | H04W 4/40 380/270 |
| 2015/0208313 | A1* | 7/2015 | Yie | H04W 24/08 370/252 |
| 2015/0208333 | A1* | 7/2015 | Yie | H04J 11/0079 455/561 |
| 2015/0208404 | A1* | 7/2015 | Yie | H04W 76/15 370/329 |
| 2015/0215847 | A1* | 7/2015 | Yie | H04W 48/12 455/434 |
| 2015/0215855 | A1* | 7/2015 | Yie | H04L 5/0048 370/329 |
| 2015/0215957 | A1* | 7/2015 | Yie | H04W 52/362 370/252 |
| 2015/0215981 | A1* | 7/2015 | Patil | H04W 72/1263 370/329 |
| 2015/0223282 | A1* | 8/2015 | Vajapeyam | H04L 1/20 370/221 |
| 2015/0250011 | A1* | 9/2015 | Lindoff | H04W 72/0453 370/225 |
| 2015/0282234 | A1* | 10/2015 | Sartori | H04W 28/0278 370/329 |
| 2015/0289312 | A1* | 10/2015 | Ranta | H04L 69/22 370/328 |
| 2015/0304896 | A1* | 10/2015 | Turtinen | H04W 36/00 370/331 |
| 2015/0327314 | A1* | 11/2015 | Liu | H04W 72/0406 370/329 |
| 2015/0350932 | A1* | 12/2015 | Da Silva | H04W 76/18 370/225 |
| 2015/0365994 | A1* | 12/2015 | Yu | H04W 76/23 370/336 |
| 2015/0382252 | A1* | 12/2015 | Yu | H04W 36/0027 370/331 |
| 2016/0021594 | A1* | 1/2016 | Yilmaz | H04W 36/03 370/332 |
| 2016/0044737 | A1* | 2/2016 | Kwon | H04W 76/19 370/328 |
| 2016/0073298 | A1* | 3/2016 | Brahmi | H04W 72/0453 455/436 |
| 2016/0135039 | A1* | 5/2016 | Droste | H04W 8/205 455/418 |
| 2016/0150443 | A1* | 5/2016 | Suryavanshi | H04W 36/03 370/331 |
| 2016/0189543 | A1* | 6/2016 | Altintas | G08B 27/008 340/905 |
| 2016/0194014 | A1* | 7/2016 | Rajendran | H04W 4/46 701/2 |
| 2016/0198315 | A1* | 7/2016 | Sakata | H04W 4/08 370/329 |
| 2016/0212665 | A1* | 7/2016 | Fukuta | H04W 76/14 |
| 2016/0227463 | A1* | 8/2016 | Baugh | H04W 76/14 |
| 2016/0234806 | A1* | 8/2016 | Le Thierry D'Ennequin | H04W 72/005 |
| 2017/0070924 | A1* | 3/2017 | Wu | H04W 76/23 |
| 2017/0142741 | A1* | 5/2017 | Kaur | H04W 76/14 |
| 2017/0150302 | A1* | 5/2017 | Sorrentino | H04L 12/189 |
| 2017/0188410 | A1* | 6/2017 | Yaver | H04W 72/14 |
| 2017/0215114 | A1* | 7/2017 | Li | H04W 76/30 |
| 2017/0215224 | A1* | 7/2017 | Ke | H04W 8/005 |
| 2017/0223757 | A1* | 8/2017 | Tsuboi | H04W 76/25 |
| 2017/0331670 | A1* | 11/2017 | Parkvall | H04W 52/0245 |
| 2017/0366236 | A1* | 12/2017 | Ryoo | H04B 7/0421 |
| 2018/0049162 | A1* | 2/2018 | Patil | H04W 72/04 |
| 2018/0302813 | A1* | 10/2018 | Hahn | H04W 24/08 |
| 2019/0141771 | A1* | 5/2019 | Ma | H04W 76/18 |

OTHER PUBLICATIONS

Zte, "Discussion on the V2V path selection between Uu and PC5", Agenda Item: 8.2.2, 3GPP TSG-RAN WG2 Meeting #93bis, R2-162401, Dubrovnik, Croatia, Apr. 11-15, 2016.

International Search Report issued by the State Intellectual Property Office of the P.R. China for corresponding International Patent Application No. PCT/CN2016/094630, dated Apr. 27, 2017, with an English translation.

Written Opinion of the International Searching Authority issued for corresponding International Patent Application No. PCT/CN2016/094630, dated Apr. 27, 2017, with an English translation.

* cited by examiner

INFORMATION TRANSMISSION METHOD AND APPARATUS AND COMMUNICATION SYSTEM

CROSS REFERENCE TO RELATED APPLICATIONS

This application is a continuation application of International Application PCT/CN2016/094630 filed on Aug. 11, 2016, the entire contents of which are incorporated herein by reference.

TECHNICAL FIELD

This disclosure relates to the field of communication technologies, and in particular to an information transmission method and apparatus and communication system.

BACKGROUND

With the wide spread and globalization of long-term evolution (LTE) communication technologies, applications based on such technologies are becoming more and more widely used. Among them, an intelligent transportation system has become a very popular application direction. In the recent research work of the 3rd Generation Partnership Project (3GPP), Vehicle-to-everything (V2X) communication was established as an important research.

Figure 1:
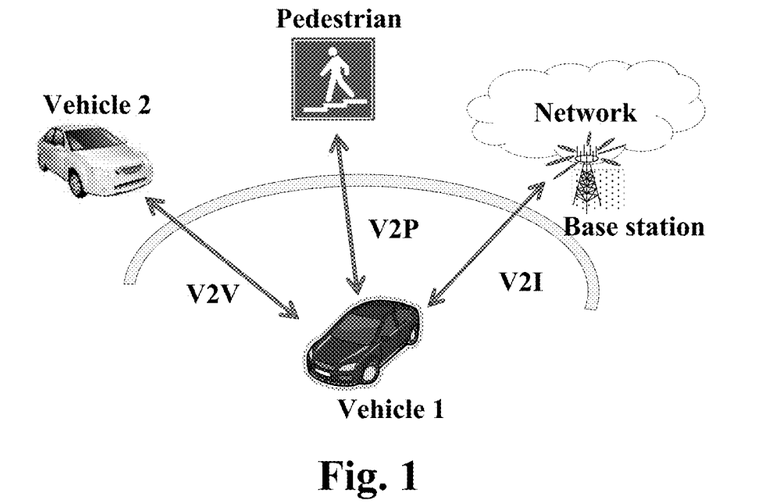
FIG. 1 is a schematic diagram of typical application scenarios of the V2X communication.

FIG. 1 is a schematic diagram of typical application scenarios of the V2X communication. As shown in FIG. 1, the V2X communication may include several typical application scenarios: vehicle-to-vehicle (V2V) communication, which is communication applicable between vehicles moving fast (such as between vehicle 1 and vehicle 2 shown in FIG. 1); vehicle-to-pedestrian (V2P) communication, which is communication applicable between a vehicle moving fast and a pedestrian holding a user equipment (such as between vehicle 1 and the pedestrian shown in FIG. 1); pedestrian-to-vehicle (P2V) communication, which is communication applicable between a pedestrian holding a user equipment and a vehicle moving fast (such as between vehicle 1 and the pedestrian shown in FIG. 1); and vehicle-to-infrastructure (V2I) communication, which is communication between a vehicle and an infrastructure (such as between vehicle 1 and the base station shown in FIG. 1).

In the above scenarios, information needing to be transmitted may be referred to as transmission information (or information, in brief), and the information may include V2X information, P2V information, and the like. Taking the P2V scenario as an example, the user equipment supporting the P2V application may transmit application layer information including such information as a location, etc. A size of the P2V information is variable, so a size of a physical resource carrying the P2V information should also be variable. A cellular link (which may also be referred to as an air-interface link) and a sidelink may be configured for the user equipment to transmit the P2V information.

On one hand, two user equipments (UEs) may communicate via a cellular link. In performing information transmission by using the cellular network, information from a source user equipment will be transmitted to a source base station via the air interface, and the source base station will transmit the information to a core network. The core network finds a target base station according to an IP address, and transmits the information to the target base station, and the target base station transmits the information to a target user equipment.

On the other hand, two user equipments may communicate via a sidelink. For two user equipments that are relatively close in distance, for example, after being authorized by an evolved universal terrestrial radio access network (E-UTRAN), information may be transmitted by means of sidelink communication.

A sidelink communication mode refers to that a packet does not need to pass a core network and a base station, and a communication link may be directly established between user equipment 1 and user equipment 2 for communication. A sidelink communication may also be referred to as a device to device (D2D) communication. And a sidelink discovery procedure is generally performed before performing sidelink communication. For example, user equipment 1 needs to first discover whether user equipment 2 is near before transmitting information to user equipment 2 in the sidelink communication mode.

Figure 2:
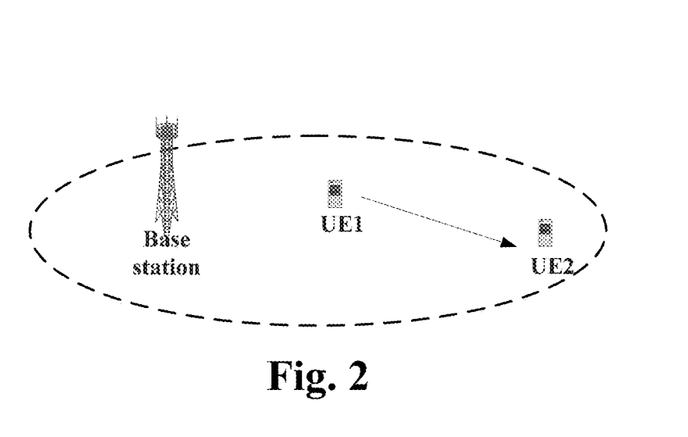
FIG. 2 is a schematic diagram of the sidelink communication.
Figure 3:
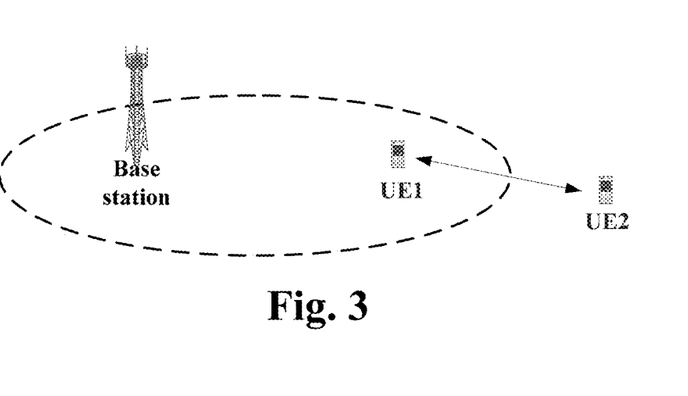
FIG. 3 is another schematic diagram of the sidelink communication.
Figure 4:
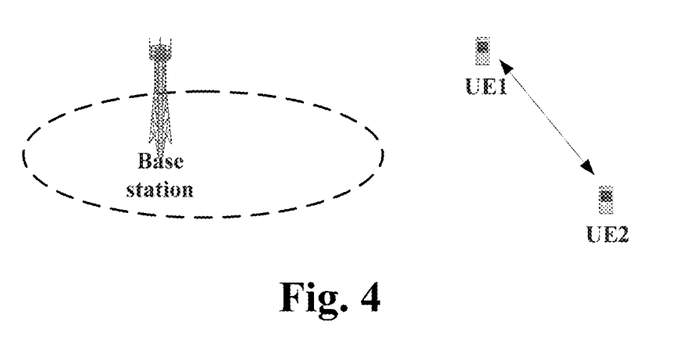
FIG. 4 is a further schematic diagram of the sidelink communication.

FIG. 2 is a schematic diagram of the sidelink communication, in which a case where two user equipments (user equipment 1 and user equipment 2) under coverage of a base station (such as an eNB) perform sidelink discovery or establish sidelink communication is shown. FIG. 3 is another schematic diagram of the sidelink communication, in which a case where one user equipment (user equipment 1) under coverage of a base station and another user equipment (user equipment 2) not under the coverage of the base station perform sidelink discovery or establish sidelink communication is shown. And FIG. 4 is a further schematic diagram of the sidelink communication, in which a case where two user equipments (user equipment 1 and user equipment 2) not under coverage of a base station perform sidelink discovery or establish sidelink communication is shown.

Before performing sidelink transmission by a user equipment, the user equipment may be configured with a resource pool. A scheduling assignment (SA) pool in the resource pool may be used for transmitting a physical sidelink control channel (PSCCH). The PSCCH may carry sidelink control information (SCI) format 0 information. According to existing protocols, the SCI format 0 information will be transmitted repeatedly twice at two different subframes in the SA resource pool.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that for a user equipment under coverage of a base station, the base station may configure the user equipment to use an air-interface link or a sidelink to transmit information. Once an application layer of the user equipment selects the air-interface link to transmit information and notify to an access (AS) layer of the user equipment, if the air-interface link is unable to transmit data normally at this moment (for example, a radio link failure (RLF) occurs in the air-interface link), the information will not be able to be transmitted successfully.

Embodiments of this disclosure provide an information transmission method and apparatus and communication system. Even if in a case where an air-interface link is unable to transmit data normally, data information can be transmitted successfully in other links.

According to a first aspect of the embodiments of this disclosure, there is provided an information transmission method, applicable to a user equipment capable of using an air-interface link and a sidelink to perform data transmission with another user equipment, the information transmission method including:

receiving, by the user equipment, indication information transmitted by a base station indicating that the user equipment is capable of using the sidelink in a case where the air-interface link is incapable of normally transmitting data; and using the sidelink by the user equipment to perform data transmission in the case where the air-interface link is incapable of normally transmitting data.

According to a second aspect of the embodiments of this disclosure, there is provided an information transmission apparatus, configured in a user equipment capable of using an air-interface link and a sidelink to perform data transmission, the information transmission apparatus including:

an indication receiving unit configured to receive indication information transmitted by a base station indicating that the user equipment is capable of using the sidelink in a case where the air-interface link is incapable of normally transmitting data; and a data transmitting unit configured to use the sidelink to perform data transmission in the case where the air-interface link is incapable of normally transmitting data.

According to a third aspect of the embodiments of this disclosure, there is provided a communication system, including a first user equipment and a second user equipment capable of using an air-interface link and a sidelink to perform data transmission, the communication system further including:

a base station configured to transmit indication information to the first user equipment indicating that the first user equipment is capable of using the sidelink in a case where the air-interface link is incapable of normally transmitting data;

the first user equipment is configured to use the sidelink to perform data transmission with the second user equipment in the case where the air-interface link is incapable of normally transmitting data.

An advantage of the embodiments of this disclosure exists in that the base station indicates that the user equipment is able to use a sidelink in a case where an air-interface link is unable to transmit data normally, and the user equipment uses the sidelink to perform data transmission with another user equipment in the case where the air-interface link is unable to transmit data normally. Hence, even if in a case where an air-interface link is unable to transmit data normally, data information may be transmitted successfully in other links.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a node B, or an evolved node B (eNB), etc., and may include some or all of their functions. In this disclosure, the term "base station" shall be used. Each base station may provide communication coverage for a specific geographical area. And a term "cell" may refer to a base station and/or its coverage area, which is dependent on a context of the term.

In this disclosure, a mobile station or device may be referred to as "a user equipment (UE)". The user equipment may be fixed or mobile, and may also be referred to as a mobile station, a terminal, an access terminal (AT), a subscriber unit, or a station, etc. The user equipment may be a cellular phone, a personal digital assistant (PDA), a wireless modem, a wireless communication device, a hand-held device, a lap-top, or a cordless telephone, etc.

Embodiment 1

Figure 5:
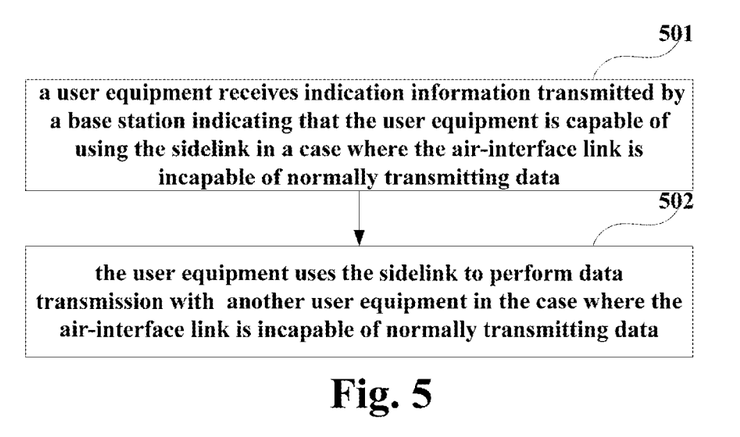
FIG. 5 is a flowchart of the information transmission method of Embodiment 1 of this disclosure.

These embodiments of this disclosure provide an information transmission method, applicable to a user equipment capable of using an air-interface link and a sidelink to perform data transmission with another user equipment. FIG. 5 is a flowchart of the information transmission method of the embodiment of this disclosure. As shown in FIG. 5, the information transmission method includes:

Block 501: a user equipment receives indication information transmitted by a base station indicating that the user equipment is capable of using the sidelink in a case where the air-interface link is incapable of normally transmitting data; and Block 502: the user equipment uses the sidelink to perform data transmission with another user equipment in the case where the air-interface link is incapable of normally transmitting data.

In an embodiment, a certain user equipment may perform transmission of V2X information with another user equipment. The V2X information refers to, for example, information transmitted between equipments that perform V2X communication, such as V2V information, V2P information, V2I information, V2N (vehicle-to-network) information, I2V information, P2V information, or the like; however, this disclosure is not limited thereto. And following description shall be given by taking P2V information as an example.

In an embodiment, the base station may be a macro base station (for example, an eNB), and the user equipment is served by a macro cell generated by the macro base station; or the base station may be a micro base station, and the user equipment is served by a micro cell (such as a pico cell or a small cell) generated by the micro base station. However, the embodiment of this disclosure is not limited thereto, and a particular scenario may be determined according to an actual situation.

In an embodiment, the case where the air-interface link is incapable of normally transmitting data may include that a radio link failure occurs in the air-interface link, or a connection reestablishment procedure is performed in the air-interface link, or a handover procedure is performed in the air-interface link. However, the embodiment of this disclosure is not limited thereto, and it may also be other cases where the air-interface link is incapable of normally transmitting data.

Following description shall be given by taking that a radio link failure occurs in the air-interface link as an example first.

In an embodiment, the user equipment may also receive one or more resources configured by the base station for the sidelink. The base station indicates that the user equipment is able to use the sidelink in the case where the radio link failure occurs in the air-interface link, and configures corresponding one or more resources for the sidelink; and the user equipment uses the sidelink to perform data transmission in the case where the radio link failure occurs in the air-interface link. Hence, even if in the case where the radio link failure occurs in the air-interface link, data information may be transmitted successfully.

In one embodiment, using the sidelink by the user equipment to perform data transmission in the case where the radio link failure occurs in the air-interface link may include: notifying, by an access layer of the user equipment to an application layer of the user equipment, information indicating that the radio link failure occurs in the air-interface link; selecting the sidelink by the application layer of the user equipment to transmit data when it needs to transmit the data; and using the sidelink by the access layer of the user equipment to transmit the data according to the selection of the application layer.

The application layer of the user equipment may be, for example, an application program running independently, or a functional entity, in the user equipment. And the access layer of the user equipment may be an entity in communication with other equipments, such as a media access control (MAC) layer, a packet data convergence protocol (PDCP) layer, or the like. However, this disclosure is not limited thereto, and the application layer and the access layer of this disclosure should be broadly understood, and should not be limited to one or some of protocol layers.

Figure 6:
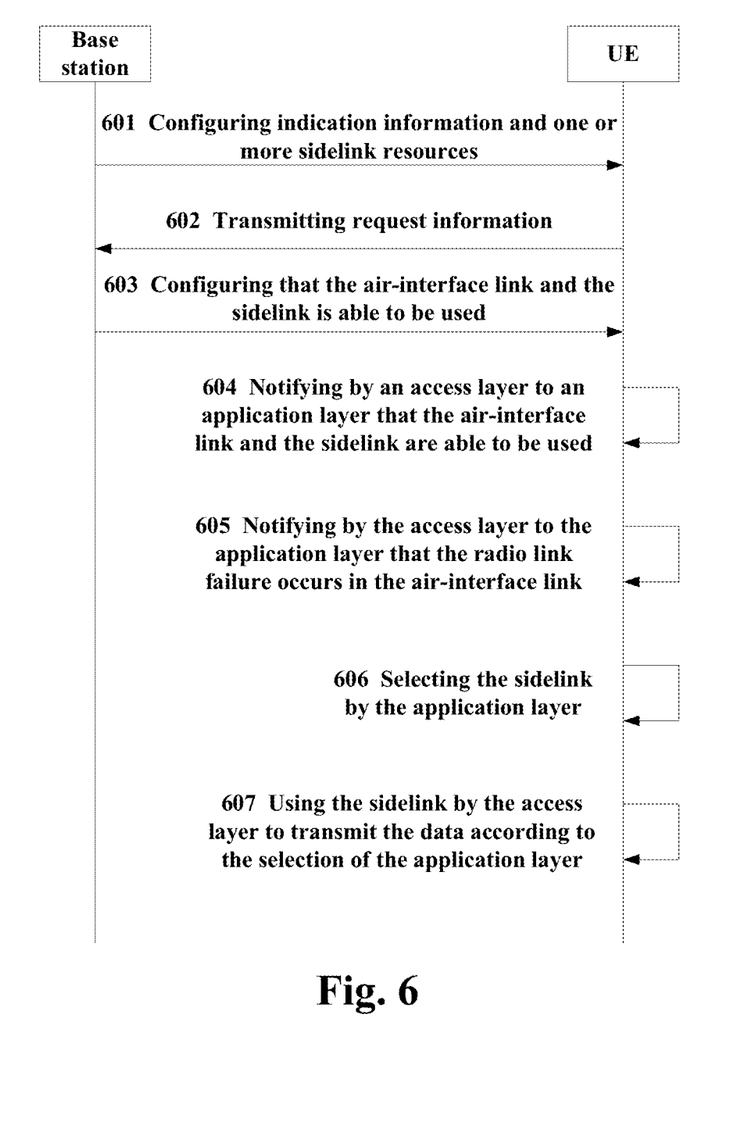
FIG. 6 is another flowchart of the information transmission method of Embodiment 1 of this disclosure.

FIG. 6 is another flowchart of the information transmission method of the embodiment of this disclosure, which shall be described from a base station side and a user equipment side. As shown in FIG. 6, the information transmission method includes:

601: the base station configures indication information and one or more sidelink resources for the user equipment.

In this embodiment, the base station may configure the user equipment with the following indication information that: in transmitting information, if the application layer of the user equipment selects to use a cellular link (i.e. an air-interface link) for information transmission and the cellular link is in a radio link failure state, the user equipment may use the sidelink to transmit the information.

Furthermore, the base station may configure the user equipment with one or more related sidelink resources via broadcast signaling.

602: the user equipment transmits request information to the base station.

The user equipment may transmit request information containing an interested service to the base station; for example, the user equipment is interested in transmitting P2V information, etc.

603: the base station configures that the user equipment is able to use the air-interface link and the sidelink to transmit information.

In this embodiment, the base station allows that both the air-interface link and the sidelink may be used by the user equipment; and furthermore, the base station may configure one or more corresponding resources.

604: an access layer of the user equipment notifies to an application layer that the air-interface link and the sidelink are able to be used to transmit information.

In this embodiment, when the information needs to be transmitted, the application layer makes a selection and notifies to the access layer.

605: the access layer of the user equipment notifies to the application layer of the user equipment, the information indicating that the radio link failure occurs in the air-interface link.

In this embodiment, when the radio link failure occurs in the air-interface link, the access layer of the user equipment may notify the information to the application layer by inter-layer exchange, so that the application layer avoids selecting the air-interface link (i.e. a cellular transmission link). The case where the radio link failure occurs in the air-interface link include, for example, a timer T310 or T311 is running; reference may be made to subsection 7.3 of the existing TS36.331 for particular contents of T310 or T311, and related contents of T310 are shown in Table 1 below:

TABLE 1

Contents of timer T310

| Timer | Start | Stop | At expiry |
|---|---|---|---|
| T310 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |

Related contents of T311 are shown in Table 2 below:

TABLE 2

Contents of timer T311

| Timer | Start | Stop | At expiry |
|---|---|---|---|
| T311 | Upon initiating the RRC connection re-establishment procedure | Selection of a suitable E-UTRA cell or a cell using another RAT | Enter RRC_IDLE | it should be noted that the case where the radio link failure occurs in the air-interface link is illustrated above by taking whether timer T310 or T311 is running as an example. However, this disclosure is not limited thereto, and whether a radio link failure occurs in an air-interface link may also be determined by other means.

606: the application layer of the user equipment selects a sidelink to transmit data when it needs to transmit the data.

In this embodiment, when there exists information needing to be transmitted, the application layer will not select a cellular link experiencing a link failure for transmission, and will select a sidelink for transmission; and the application layer notifies the information needed to be transmitted and the selected link to the access layer, so that the access layer transmits the information in the sidelink.

607: the access layer of the user equipment uses the sidelink to transmit the data according to the selection of the application layer.

In another embodiment, using the sidelink to transmit data by the user equipment in the case where the radio link failure occurs in the air-interface link may further include: selecting the air-interface link or the sidelink by the application layer of the user equipment to transmit data in need of transmitting the data; and using the sidelink to transmit data by the access layer of the user equipment to transmit data in the case where the radio link failure occurs in the air-interface link and the application layer selects the air-interface link.

Figure 7:
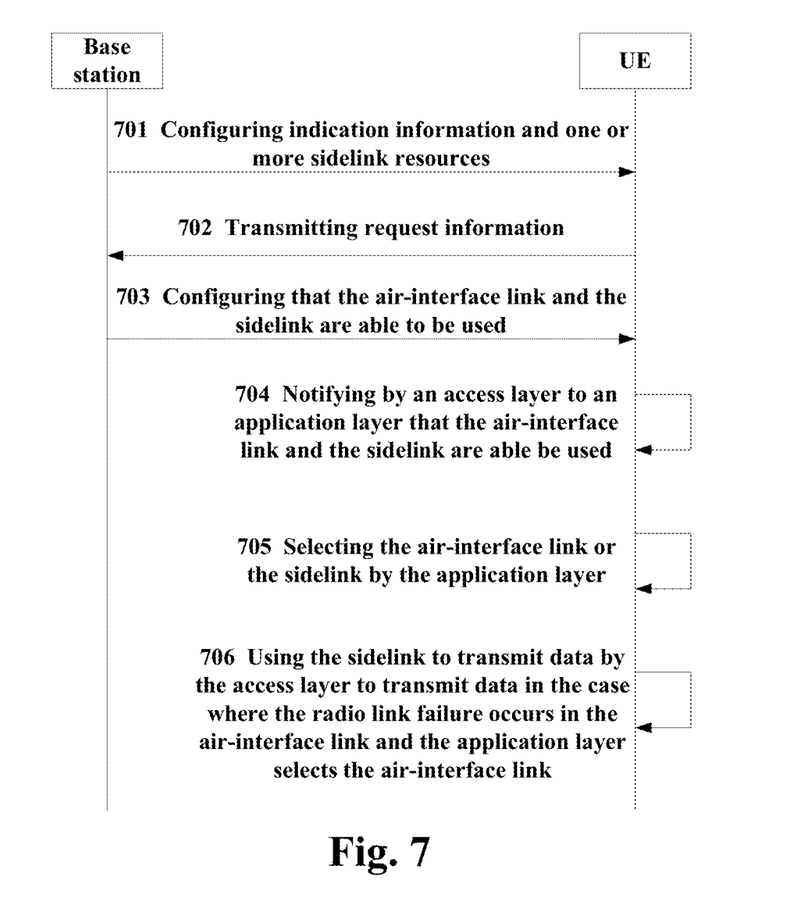
FIG. 7 is a further flowchart of the information transmission method of Embodiment 1 of this disclosure.

FIG. 7 is a further flowchart of the information transmission method of the embodiment of this disclosure, which shall be described from a base station side and a user equipment side. As shown in FIG. 7, the information transmission method includes:

701: the base station configures indication information and one or more sidelink resources for the user equipment.

In this embodiment, the base station may configure the user equipment with the following indication information that: in transmitting information, if the application layer of the user equipment selects to use a cellular link for information transmission and the cellular link is in a radio link failure state, the user equipment may use the sidelink to transmit the information.

and furthermore, the base station may configure the user equipment with one or more related sidelink resources via broadcast signaling.

702: the user equipment transmits request information to the base station.

The user equipment may transmit request information containing an interested service to the base station; for example, the user equipment is interested in transmitting P2V information, etc.

703: the base station configures that the user equipment is able to use the air-interface link and the sidelink to transmit information.

In this embodiment, the base station allows that both the air-interface link and the sidelink may be used by the user equipment; and furthermore, the base station may configure one or more corresponding resources.

704: the access layer of the user equipment notifies to the application layer that the air-interface link and the sidelink are able to be used to transmit information.

In this embodiment, when the information needs to be transmitted, the application layer makes a selection and notifies to the access layer.

705: the application layer of the user equipment selects the air-interface link or the sidelink to transmit data in need of transmitting the data.

In this embodiment, when a radio link failure (for example, a timer T310 or T311 is running) occurs in the air-interface link, the access layer of the user equipment does not notify the information to the application layer, and the application layer still deems by default that both the cellular link and sidelink are able to operate normally;

when there exists information needing to be transmitted, the application layer, according to information obtained by itself, forwards the information needing to be transmitted to the access layer, and notifies the selected transmission link to the access layer.

706: the access layer of the user equipment uses the sidelink to transmit data in the case where the radio link failure occurs in the air-interface link and the application layer selects the air-interface link.

In this embodiment, for other cases (such as a case where the radio link failure occurs in the air-interface link and the application layer selects the sidelink), the access layer of the user equipment may still use the sidelink selected by the application layer to transmit data.

For example, when the access layer of the user equipment is informed by the application layer to use a cellular link to transmit the information and finds that the cellular link is experiencing a radio link failure (for example, a timer T310 or T311 is running), the access layer of the user equipment uses one or more sidelink resources to perform information transmission, and does not use the air-interface link selected by the application layer.

It should be noted that FIGS. 6 and 7 only schematically show the embodiment of this disclosure; however, this disclosure is not limited thereto. For example, an order of execution of the steps or blocks may be appropriately adjusted; and furthermore, some other steps or blocks may be added, or some of these steps or blocks may be reduced. And appropriate variants may be made by those skilled in the art according to what is described above, without being limited to the disclosure contained in the above figures.

The above description is given by taking that a radio link failure occurs in the air-interface link as an example.

In an embodiment, the case where the air-interface link is incapable of normally transmitting data may further include that a connection reestablishment procedure is performed in the air-interface link, or a handover procedure is performed in the air-interface link, with processing procedures being similar to those shown in FIGS. 6 and 7. Only determination of the above procedures shall be described below.

In this embodiment, a connection reestablishment procedure being performed in the air-interface link may include, for example, a timer T301 is running. And a handover procedure being performed in the air-interface link may include, for example, a timer T304 is running. However, this disclosure is not limited thereto. For example, if one or more of the timers T301, T304, T310 and T311 is/are running, it may be deemed that a case where the air-interface link is incapable of normally transmitting data occurs.

Reference may be made to subsection 7.3 of the existing TS36.331 for particular contents of T301 or T304, and related contents of T301 and T304 are shown in Table 3 below:

TABLE 3

Contents of timers T301 and T304

| Timer | Start | Stop | At expiry |
|---|---|---|---|
| T301 | Transmission of RRC-ConnectionReestabilshmentRequest | Reception of RRCConnectionReestablishment or RRCConnectionReestablishmentReject message as well as when the selected cell becomes unsuitable | Go to RRC_IDLE |
| T304 | Reception of RRCConnectionReconfiguration message including the MobilityControl Info or reception of MobilityFromEUTRAComm and message including CellChangeOrder | Criterion for successful completion of handover within E-UTRA, handover to E-UTRA or cell change order is met | In case of cell change order from E-UTRA or intra E-UTRA handover, initiate the RRC connection re-establishment procedure; In case of handover to E-UTRA, perform the actions defined in the specifications applicable for the source RAT. |

It should be noted that the case where a connection reestablishment procedure is performed in the air-interface link or a handover procedure is performed in the air-interface link is illustrated above by taking whether the timer T301 or T304 is running. However, this disclosure is not limited thereto, and whether the air-interface link is incapable of normally transmitting data may also be determined by other means.

It can be seen from the above embodiments that the base station indicates that the user equipment is able to use a sidelink in a case where an air-interface link is unable to transmit data normally, and the user equipment uses the sidelink to perform data transmission with another user equipment in the case where the air-interface link is unable to transmit data normally. Hence, even if in a case where an air-interface link is unable to transmit data normally, data information may be transmitted successfully in other links.

Embodiment 2

These embodiments of this disclosure provide an information transmission apparatus, configured in a user equipment capable of using an air-interface link and a sidelink to perform data transmission. These embodiments correspond to the information transmission method of Embodiment 1, with identical contents being not going to be described herein any further.

Figure 8:
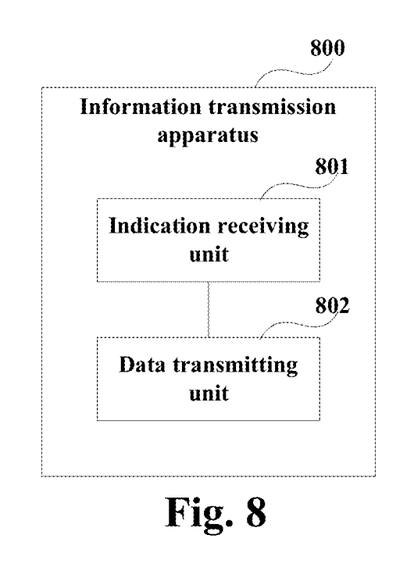
FIG. 8 is a schematic diagram of the information transmission apparatus of Embodiment 2 of this disclosure.

FIG. 8 is a schematic diagram of the information transmission apparatus of the embodiment of this disclosure. As shown in FIG. 8, the information transmission apparatus 800 includes:

an indication receiving unit 801 configured to receive indication information transmitted by a base station indicating that the user equipment is capable of using the sidelink in a case where the air-interface link is incapable of normally transmitting data; and a data transmitting unit 802 configured to use the sidelink to perform data transmission with another user equipment in the case where the air-interface link is incapable of normally transmitting data.

In an embodiment, the case where the air-interface link is incapable of normally transmitting data may include that a radio link failure occurs in the air-interface link, or a connection reestablishment procedure performs in the air-interface link, or a handover procedure performs in the air-interface link. However, this disclosure is not limited thereto.

Figure 9:
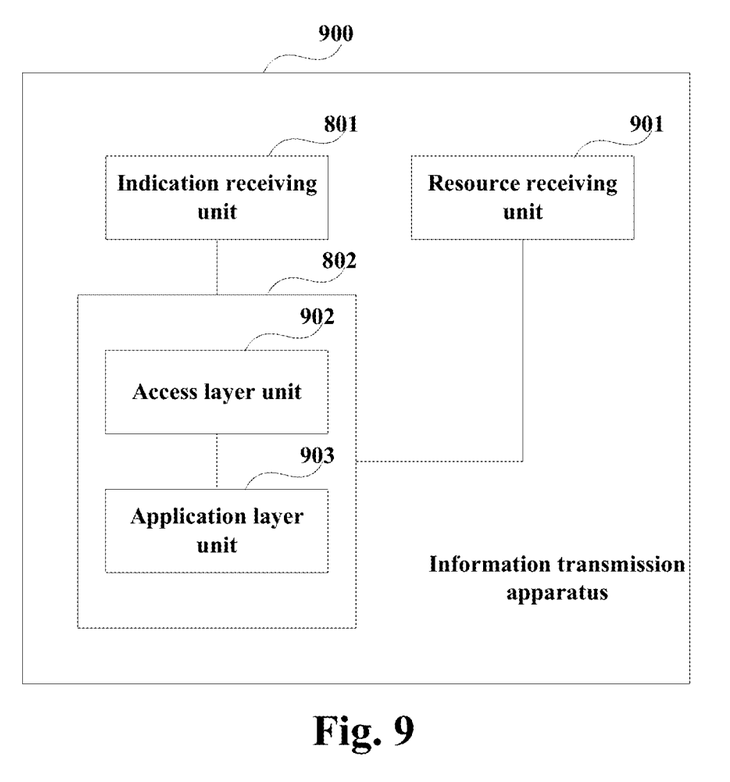
FIG. 9 is another schematic diagram of the information transmission apparatus of Embodiment 2 of this disclosure.

FIG. 9 is another schematic diagram of the information transmission apparatus of the embodiment of this disclosure. As shown in FIG. 9, the information transmission apparatus 900 includes an indication receiving unit 801 and a data transmitting unit 802, as described above.

As shown in FIG. 9, the information transmission apparatus 900 may further include:

a resource receiving unit 901 configured to receive one or more resources configured by the base station for the sidelink.

As shown in FIG. 9, the data transmitting unit 802 may include an access layer unit 902 and an application layer unit 903.

In one embodiment, the access layer unit 902 notifies information indicating that the air-interface link is incapable of normally transmitting data to the application layer unit 903, the application layer unit 903 selects the sidelink to transmit data when it needs to transmit the data, and the access layer unit 902 uses the sidelink to transmit the data according to the selection of the application layer unit 903.

In another embodiment, the application layer unit 903 selects the air-interface link or the sidelink to transmit data when it needs to transmit the data, and the access layer unit 902 uses the sidelink to transmit the data in a case where the air-interface link is incapable of normally transmitting data and the application layer unit selects the air-interface link.

In an embodiment, the case where the air-interface link is incapable of normally transmitting data includes that a timer T310 or T311 is running, or a timer T301 is running or a timer T304 is running.

It can be seen from the above embodiments that the base station indicates that the user equipment is able to use a sidelink in a case where an air-interface link is unable to transmit data normally, and the user equipment uses the sidelink to perform data transmission with another user equipment in the case where the air-interface link is unable to transmit data normally. Hence, even if in a case where an air-interface link is unable to transmit data normally, data information may be transmitted successfully in other links.

Embodiment 3

These embodiments of this disclosure provide a communication system, with contents identical to those in Embodiment 1 or 2 being not going to be described herein any further.

Figure 10:
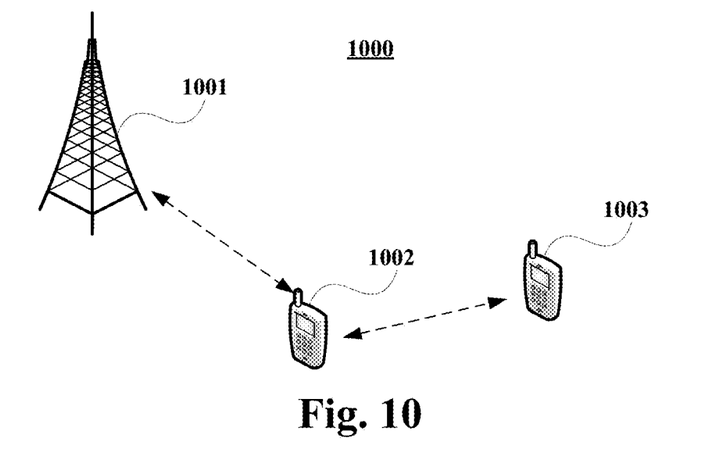
FIG. 10 is a schematic diagram of the communication system of Embodiment 3 of this disclosure.

FIG. 10 is a schematic diagram of the communication system of the embodiment of this disclosure. As shown in FIG. 10, the communication system 1000 may include a base station 1001, a first user equipment 1002 and a second user equipment 1003. The first user equipment 1002 may be configured with the information transmission apparatus 800 or 900 described in Embodiment 2.

The embodiment of this disclosure further provides a user equipment, configured with the information transmission apparatus 800 or 900 described in Embodiment 2.

Figure 11:
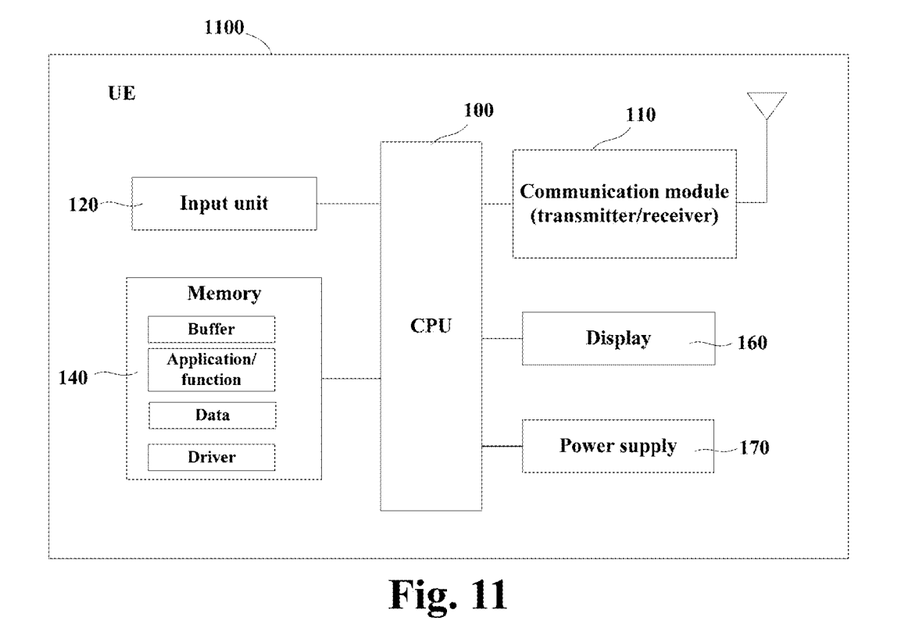
FIG. 11 is a schematic diagram of the user equipment of Embodiment 3 of this disclosure.

FIG. 11 is a schematic diagram of the user equipment of the embodiment of this disclosure. As shown in FIG. 11, the user equipment 1100 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions. The central processing unit 100 may be configured to carry out the information transmission method described in Embodiment 1.

For example, the central processing unit 100 may be configured to perform following control: receiving indication information transmitted by a base station indicating that the user equipment is capable of using the sidelink in a case where the air-interface link is incapable of normally transmitting data; and using the sidelink to perform data transmission with another user equipment in the case where the air-interface link is incapable of normally transmitting data.

As shown in FIG. 11, the user equipment 1100 may further include a communication module 110, an input unit 120, a display 160 and a power supply 170. Functions of the above components are similar to those in the relevant art, and shall not be described herein any further. It should be noted that the user equipment 1100 does not necessarily include all the parts shown in FIG. 11, and the above components are not necessary; and furthermore, the user equipment 1100 may include parts not shown in FIG. 11, and the relevant art may be referred to.

The embodiment of this disclosure further provides a base station.

Figure 12:
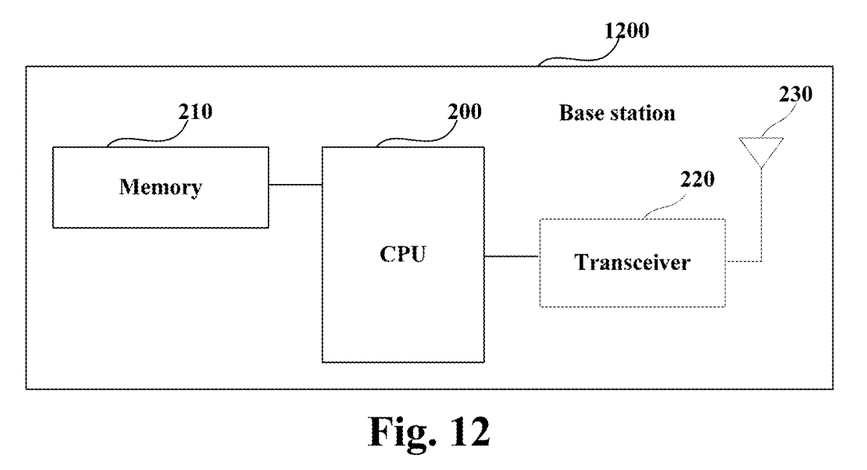
FIG. 12 is a schematic diagram of the base station of Embodiment 3 of this disclosure.

FIG. 12 is a schematic diagram of the base station of the embodiment of this disclosure. As shown in FIG. 12, the base station 1200 may include a central processing unit (CPU) 200 and a memory 210, the memory 210 being coupled to the central processing unit 200. The memory 210 may store various data, and furthermore, it may store a program for information processing, and execute the program under control of the central processing unit 200. The central processing unit 200 may be configured to carry out the information transmission method described in Embodiment 1.

For example, the central processing unit 200 may be configured to perform following control: transmitting indication information to the user equipment indicating that the user equipment is capable of using the sidelink in a case where the air-interface link is incapable of normally transmitting data; and configuring one or more resources of the sidelink for the user equipment.

Furthermore, as shown in FIG. 12, the base station 1200 may include a transceiver 220, and an antenna 230, etc. Functions of the above components are similar to those in the relevant art, and shall not be described herein any further. It should be noted that the base station 1200 does not necessarily include all the parts shown in FIG. 12, and furthermore, the base station 1200 may include parts not shown in FIG. 12, and the relevant art may be referred to.

An embodiment of the present disclosure provides a computer readable program code, which, when executed in an information transmission apparatus or a user equipment, will cause the information transmission apparatus or the user equipment to carry out the information transmission method described in Embodiment 1.

An embodiment of the present disclosure provides a computer readable medium, including a computer readable program code, which will cause an information transmission apparatus or a user equipment to carry out the information transmission method described in Embodiment 1.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 8 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An information transmission method, applicable to a user equipment capable of using an air-interface link via a base station and a sidelink to perform data transmission to another user equipment, the information transmission method comprising:
   receiving, by the user equipment, indication information transmitted by a base station indicating that the user equipment is capable of using the sidelink in a case where the air-interface link is incapable of normally transmitting data due to the user equipment out of the coverage of the base station, wherein the indication information includes one or more resources configured by the base station for the sidelink to perform the data transmission to the another user equipment; and
   switching from using the air-interface link to using the sidelink with the one or more resources by the user equipment to perform data transmission to the another user equipment in the case where the air-interface link is incapable of normally transmitting the data due to the user equipment out of the coverage of the base station,
   wherein switching from using the air-interface link to using the sidelink with the one or more resources by the user equipment to perform data transmission to the another user equipment in the case where the air-interface link is incapable of normally transmitting the data due to the user equipment out of the coverage of the base station comprises:
      notifying, by an access layer of the user equipment to an application layer of the user equipment, information indicating that the air-interface link is incapable of normally transmitting the data;
      selecting the sidelink by the application layer of the user equipment to transmit the data in need of transmitting the data, and
      using the sidelink by the access layer of the user equipment to transmit the data according to the selection of the application layer.

2. The information transmission method according to claim 1, wherein the case where the air-interface link is incapable of normally transmitting data comprises that a radio link failure occurs in the air-interface link, or a connection reestablishment procedure is performed in the air-interface link, or a handover procedure is performed in the air-interface link.

3. The information transmission method according to claim 1, wherein the case where the air-interface link is incapable of normally transmitting data comprises that a timer T310 or T311 is running, or a timer T301 is running, or a timer T304 is running.

4. An information transmission apparatus, configured in a user equipment capable of using an air-interface link via a base station and a sidelink to perform data transmission to another user equipment, the information transmission apparatus comprising:
   a memory that stores a plurality of instructions; and
   processor circuitry that couples to the memory and that is configured to execute the instructions to:
   receive indication information transmitted by a base station indicating that the user equipment is capable of using the sidelink in a case where the air-interface link is incapable of normally transmitting data due to the user equipment out of the coverage of the base station, wherein the indication information includes one or more resources configured by the base station for the sidelink to perform data transmission to the another user equipment; and
   switch from using the air-interface link to using the sidelink with the one or more resources to perform data transmission to the another user equipment in the case where the air-interface link is incapable of normally transmitting data due to the user equipment out of the coverage of the base station, wherein the switching includes:
   notifying information indicating that the air-interface link is incapable of normally transmitting the data;
   selecting the sidelink to transmit the data in need of transmitting the data; and
   using the sidelink to transmit the data according to the selecting of the sidelink.

5. The information transmission apparatus according to claim 4, wherein the case where the air-interface link is incapable of normally transmitting data comprises that a radio link failure occurs in the air-interface link, or a connection reestablishment procedure performs in the air-interface link, or a handover procedure performs in the air-interface link.

6. The information transmission apparatus according to claim 4, wherein the case where the air-interface link is incapable of normally transmitting data comprises that a timer T310 or T311 is running, or a timer T301 is running, or a timer T304 is running.

7. A communication system, comprising: a base station; a first user equipment; and a second user equipment capable of using an air-interface link via the base station and a sidelink to perform data transmission to the first user equipment,
   wherein the base station is configured to transmit indication information to the first user equipment indicating that the first user equipment is capable of using the sidelink in a case where the air-interface link is incapable of normally transmitting data due to the first user equipment out of the coverage of the base station, wherein the indication information includes one or more resources configured by the base station for the sidelink to perform the data transmission to the second user equipment;

wherein, the first user equipment is configured to switch from using the air-interface link to using the sidelink with the one or more resources to perform data transmission to the second user equipment in the case where the air-interface link is incapable of normally transmitting data due to the first user equipment out of the coverage of the base station, wherein the switching includes:

notifying information indicating that the air-interface link is incapable of normally transmitting the data;

selecting the sidelink to transmit the data in need of transmitting the data; and using the sidelink to transmit the data according to the selecting of the sidelink.

8. The communication system according to claim 7, wherein the case where the air-interface link is incapable of normally transmitting data comprises that a radio link failure occurs in the air-interface link, or a connection reestablishment procedure performs in the air-interface link, or a handover procedure performs in the air-interface link.

* * * * *